(12) United States Patent
Kumar et al.

(10) Patent No.: US 12,554,937 B2
(45) Date of Patent: Feb. 17, 2026

(54) FEW SHOT INCREMENTAL LEARNING FOR NAMED ENTITY RECOGNITION

(71) Applicant: INTERNATIONAL BUSINESS MACHINES CORPORATION, Armonk, NY (US)

(72) Inventors: Ritesh Kumar, Morristown, NJ (US); Saurabh Goyal, Jersey City, NJ (US); Ashish Verma, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 18/307,199

(22) Filed: Apr. 26, 2023

(65) Prior Publication Data

US 2024/0362419 A1 Oct. 31, 2024

(51) Int. Cl.
*G06F 40/40* (2020.01)
*G06F 40/284* (2020.01)
(Continued)

(52) U.S. Cl.
CPC ............ *G06F 40/40* (2020.01); *G06F 40/284* (2020.01); *G06F 40/295* (2020.01); *G06V 30/412* (2022.01)

(58) Field of Classification Search
CPC ............... G10L 15/22; G10L 2015/088; G10L 2015/223; G10L 25/84; G10L 15/32;
(Continued)

(56) References Cited

U.S. PATENT DOCUMENTS 11,481,623 B2 10/2022 Karlinsky
2021/0287096 A1 9/2021 Patney
(Continued)

FOREIGN PATENT DOCUMENTS

JP 2022189799 A 12/2022
KR 20220097666 A 7/2022

OTHER PUBLICATIONS

Rebuffi, Sylvestre-Alvise et al. "iCaRL: Incremental Classifier and Representation Learning." 2017 IEEE Conference on Computer Vision and Pattern Recognition (CVPR). IEEE, 2017. 5533-5542. (Year: 2017).*

(Continued)

*Primary Examiner* — Daniel C Washburn
*Assistant Examiner* — Penny L Caudle
(74) *Attorney, Agent, or Firm* — Caleb D. Wilkes

(57) ABSTRACT

A method, computer system, and a computer program product for classification training are provided. A deep learning model is trained with a first dataset that includes annotated samples that include a first and second class. Last hidden state features corresponding to respective tokens from prototypes of the first and second class are saved. The trained deep learning model is further trained with a second dataset that includes additional annotated samples that include the first and second class and a third class. The further training includes performing a cosine similarity loss optimization and a cross entropy loss optimization. The cosine similarity loss optimization is of last hidden state features resulting from the further trained deep learning model and the first class and the second class compared to the saved last hidden state features. The cross entropy loss optimization is for classification of the first, second, and the third class.

20 Claims, 6 Drawing Sheets

(51) Int. Cl.
　　　*G06F 40/295* (2020.01)
　　　*G06V 30/412* (2022.01)
(58) Field of Classification Search
　　　CPC ......... G10L 17/24; G10L 15/28; G10L 17/04; G06F 1/3206; G06F 1/1684; G06F 1/3215
　　　See application file for complete search history.

(56) References Cited

U.S. PATENT DOCUMENTS

| | | | |
|---|---|---|---|
| 2021/0365719 | A1 | 11/2021 | Kalyuzhner |
| 2021/0374347 | A1 | 12/2021 | Yang |
| 2022/0067582 | A1 | 3/2022 | Choi |
| 2022/0172500 | A1 | 6/2022 | Hu |
| 2022/0395975 | A1 | 12/2022 | Cachet |
| 2023/0072445 | A1* | 3/2023 | Liang ................. G06N 3/04 |
| 2023/0401391 | A1* | 12/2023 | Zhang ................. G06F 40/58 |

OTHER PUBLICATIONS

Snell, J., Swersky, K., & Zemel, R. (2017). Prototypical networks for few-shot learning. Advances in neural information processing systems, 30. (Year: 2017).*

Kim, J., Yoon, I., Park, G. M., & Kim, J. H. (2020). Non-Probabilistic Cosine Similarity Loss for Few-Shot Image Classification. In BMVC. (Year: 2020).*

Barnea et al., "Contextual Object Detection with a Few Relevant Neighbors", arXiv:1711.05705v3 [cs.CV] Oct. 17, 2018, https://arxiv.org/pdf/1711.05705.pdf, 16 pages.

Cheraghian et al., "Semantic-aware Knowledge Distillation for Few-Shot Class-Incremental Learning", arXiv:2103.04059v2 [cs.CV] Mar. 31, 2021, https://arxiv.org/pdf/2103.04059.pdf, 10 pages.

Denk et al., "BERTgrid: Contextualized Embedding for 2D Document Representation and Understanding", 33rd Conference on Neural Information Processing Systems (NeurIPS 2019), arXiv:1909.04948v2 [cs.CL] Oct. 14, 2019, https://arxiv.org/pdf/1909.04948.pdf, 4 pages.

Girshick et al., "Rich feature hierarchies for accurate object detection and semantic segmentation", Tech report (v5), arXiv:1311.2524v5 [cs.CV] Oct. 22, 2014, https://arxiv.org/pdf/1311.2524.pdf, 21 pages.

Huang et al., "Few-Shot Named Entity Recognition: A Comprehensive Study", arXiv:2012.14978v1 [cs.CL] Dec. 29, 2020, https://arxiv.org/pdf/2012.14978.pdf, 12 pages.

Katti et al., "Chargrid: Towards Understanding 2D Documents", EMNLP 2018, arXiv:1809.08799v1 [cs.CL] Sep. 24, 2018, https://arxiv.org/pdf/1809.08799.pdf, 11 pages.

Liu et al., "Graph Convolution for Multimodal Information Extraction from Visually Rich Documents", arXiv:1903.11279v1 [cs.IR] Mar. 27, 2019, https://arxiv.org/pdf/1903.11279.pdf, 8 pages.

Monaikul et al., "Continual Learning for Named Entity Recognition", The Thirty-Fifth AAAI Conference on Artificial Intelligence, vol. 35 No. 15: AAAI-21 Technical Tracks 15, Published May 18, 2021, https://ojs.aaai.org/index.php/AAAI/article/view/17600, 8 pages.

Snell et al., "Prototypical Networks for Few-shot Learning", arXiv:1703.05175v2 [cs.LG] Jun. 19, 2017, 13 pages.

Xu et al., "LayoutLM: Pre-training of Text and Layout for Document Image Understanding", Proceedings of the 26th ACM SGI KDD International Conference on Knowledge Discovery and Data Mining (KDD 2020), arXiv:1912.13318v5 [cs.CL] Jun. 16, 2020, 9 pages.

Xu et al., "LayoutLMv2: Multi-modal Pre-training for Visually-rich Document Understanding", arXiv:2012.14740v4 [cs.CL] Jan. 10, 2022, https://arxiv.org/pdf/2012.14740.pdf, 13 pages.

Zhou et al., "Few-Shot Class-Incremental Learning by Sampling Multi-Phase Tasks", Journal of Latex Class Files, vol. 14, No. 8, Aug. 2015, arXiv:2203.17030v2 [cs.CV] Aug. 19, 2022, https://arxiv.org/pdf/2203.17030.pdf, 17 pages.

* cited by examiner

FEW SHOT INCREMENTAL LEARNING FOR NAMED ENTITY RECOGNITION

BACKGROUND

The present invention relates generally to the fields of deep learning models, efficient training of deep learning models, and of classification tasks performed by deep learning models.

To train a deep learning model to perform classification and then subsequently to attempt to add new classes for the deep learning model can be problematic. Adding new classes may interfere with the ability of the deep learning model to correctly classify the original classes. Moreover, adding new classes may be performed by accessing and supplementing the original training data but the original training data is not always subsequently accessible. This inaccessibility may be due to data security and/or storage regulations. Moreover, repeating the training with all of the original training data that is enhanced with new classes is time-consuming and resource-consuming.

Key value pair extraction tasks have used template based extraction or region-segmentation based approaches. For template based extraction, a pre-defined layout is processed and keys and values are extracted from known locations. For region-segmentation, a document is segmented into regions and each region is processed to extract pre-defined keys and corresponding values for the keys. These two types experience limitations and difficulties in analyzing different layouts/formats for a single type of document.

Some artificial intelligence based approaches for key value pair extraction tasks train a deep learning model using both text and image information. These artificial intelligence based approaches do not require page segmentation or template knowledge to extract keys and values. Adding new keys/classes is troublesome, however, because large dataset re-annotation is necessary with these artificial intelligence based approaches.

Incremental learning has supported addition of new classes to existing models. Large datasets have been needed, however, for adding new classes. Data re-annotation is time-consuming and expensive. Catastrophic forgetting in which classification accuracy for already-learned classes deteriorates may also occur. Overfitting may occur when using small datasets.

Few shot learning has been attempted by using a minimal number of examples to train a model. Transfer learning to train on one task and transfer that learning over to another different task has limitations. Few shot learning underperforms as compared to a model trained with a large dataset.

"*Continual Learning for Named Entity Recognition*" by Monaikul et al. (Thirty-Fifth AAAI Conference on Artificial Intelligence) discloses a continual learning approach in which new training material is annotated only for new entity types. To preserve the existing knowledge previously learned by the model, a Knowledge Distillation framework is exploited where the existing NER model acts as the teacher for a new NER model. The new NER model imitates the output of the teacher model on the new training set. In some embodiments, a new output layer to recognize the new entity types is added to the new NER model. In other embodiments, a tagger output layer for the new NER model is extended with new dimensions to recognize new entity types. The new training material is run through the existing NER teacher model as well as through the new NER model.

"*Few-Shot Named Entity Recognition: A Comprehensive Study*" by Huang et al. (arXiv: 2012.14978v1) discloses different techniques for enhancing few-shot learning for named entity recognition. In one technique, prototypes are constructed which represent entity types as vectors in the same representation space of individual tokens. An average of representations for all tokens belonging to a particular type is computed to determine the prototype. Prediction distribution is computed by a softmax function of the distance between x and all the entity prototypes. Nearest neighbor criterion is used to determine a label of a new token. In another technique, noisy supervised pre-training is performed for a model by obtaining a large-scale noisy web dataset, automatically annotating a large text corpora with the labels from the large-scale noisy web dataset, and inputting the annotated dataset to the model. This technique may be implemented with a linear classifier. In a third technique, unlabeled data is leveraged with labeled data via a semi-supervised learning scheme. Cross entropy using labeled tokens is performed on a teacher model, soft labels using the teacher model on unlabeled tokens are generated, and cross entropy using labeled and unlabeled tokens is applied to a student model with a weighting hyper-parameter.

US 2021/0374347 A1 to Yang et al. discloses few-shot named-entity recognition with a first named entity recognition (NER) system adapted to create a second NER system that is able to recognize a new named entity using few-shot learning. The second NER system may process support tokens that provide one or more examples of the new named entity and may process input tokens that may contain the new named entity. The second NER system may use a classifier of the first NER system to compute support token embeddings from the support tokens and input token embeddings from the input tokens. The second NER system may then recognize the new named entity in the input tokens using abstract tag transition probabilities and/or distances between the support token embeddings and the input token embeddings.

The prior art has the disadvantages of requiring re-annotation of large datasets to help a model learn new classes and/or experiencing catastrophic forgetting of original classes. Some of the prior art requires a combination of results from multiple inferencing heads. Such continual addition of inferencing heads adds undesirable complexity. Moreover, noisy annotation performed in the prior art may result in errors due to old keys being propagated to the new model.

SUMMARY

According to one exemplary embodiment, a method for classification training is provided. A deep learning model is trained with a first dataset that includes annotated samples that include a first class and a second class. Last hidden state features corresponding to respective tokens from prototypes of the first class and of the second class are saved. The trained deep learning model is further trained with a second dataset that includes additional annotated samples that include the first class, the second class, and a third class. The further training includes performing a cosine similarity loss optimization and a cross entropy loss optimization. The cosine similarity loss optimization is of last hidden state features resulting from the further trained deep learning model and the first class and the second class compared to the saved last hidden state features. The cross entropy loss optimization is for classification of the first class, the second class, and the third class. A computer system and computer program product corresponding to the above method are also disclosed herein.

With these embodiments, few-shot incremental learning may be achieved to train a model which accurately classifies for both old and new classes. Catastrophic forgetting of the original classes may be avoided while the addition of new classes is supported. Few-shot incremental learning may be achieved with a smaller training dataset for a new class so that time and resources are saved with respect to annotation/labeling requirements. Original labeled training data may be discarded and/or unused for the further training of the deep learning model to correctly predict a new class. Dependency on the original training dataset is alleviated. Few-shot incremental learning may be achieved without requiring a combination of results from multiple inferencing heads. The model becomes more flexible because huge annotation costs are not required for the model to learn to infer additional classes. Few-shot incremental learning is achieved without requiring an explicit feature extractor.

In some additional embodiments, the first dataset is larger than the second dataset. For example, the first dataset may be ten or more times larger than the second dataset. The second dataset may consist of thirty or fewer annotated samples.

With these embodiments, few-shot incremental learning may be achieved to train a model which accurately classifies for both old and new classes. Few-shot incremental learning may be achieved with a smaller training dataset that includes a new class so that time and resources are saved with respect to annotation/labeling requirements.

In some additional embodiments, the respective tokens are from first and second prototypes of the first class and from first and second prototypes of the second class. The cosine similarity loss optimization occurs for the last hidden state features resulting from the further trained deep learning model, the first and the second prototypes of the first class, and the first and the second prototypes of the second class compared to the saved last hidden state features.

In this way, few-shot incremental learning may be achieved to train a model that accurately classifies for both old and new classes while having a minimized number of prototypes of initial classes.

In some additional embodiments, additional last hidden state features corresponding to respective tokens from prototypes of the third class are saved. In addition, a fourth class may be added to the further trained deep learning model by repeating the further training with the first class, the second class, the third class, and the fourth class.

In this way, the deep learning model may be enhanced in a few-shot manner to classify an additional class while maintaining good and/or reasonable accuracy for classifying original and any previously added classes.

In some additional embodiments, the further trained deep learning model is used to perform classification of one or more new samples. The classification may include named entity recognition. The classification may include key value pair extraction.

In this manner, the deep learning model that has been trained may be used to carry out a variety of classification tasks to provide value for a model user/owner.

In some additional embodiments, the deep learning model includes a transformer architecture. The deep learning model may be pre-trained using text embeddings, visual embeddings, and layout embeddings. The deep learning model may further include a multi-modal encoder with spatial-aware self-attention mechanism. The deep learning model may be pre-trained using a masked visual-language modeling task, a text-image alignment task, and a text-image matching task.

In this manner, the deep learning model may be specialized to perform named entity recognition and/or key value pair extraction, e.g., from visually rich documents such as processing purchase orders, invoices, insurance forms, loan application forms, mortgage forms, etc.

In at least some additional embodiments, the first dataset is not used in the further training.

In this manner, few-shot incremental learning may be carried out despite no longer having access to an original training dataset.

In at least some additional embodiments, the saving of the last hidden state features occurs from the last few epochs of the training. Classification performed via the deep learning model is correct in the last few epochs.

In this manner, accuracy for classification of the deep learning model is enhanced by using those deep learning model states which achieved the highest classification accuracy.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
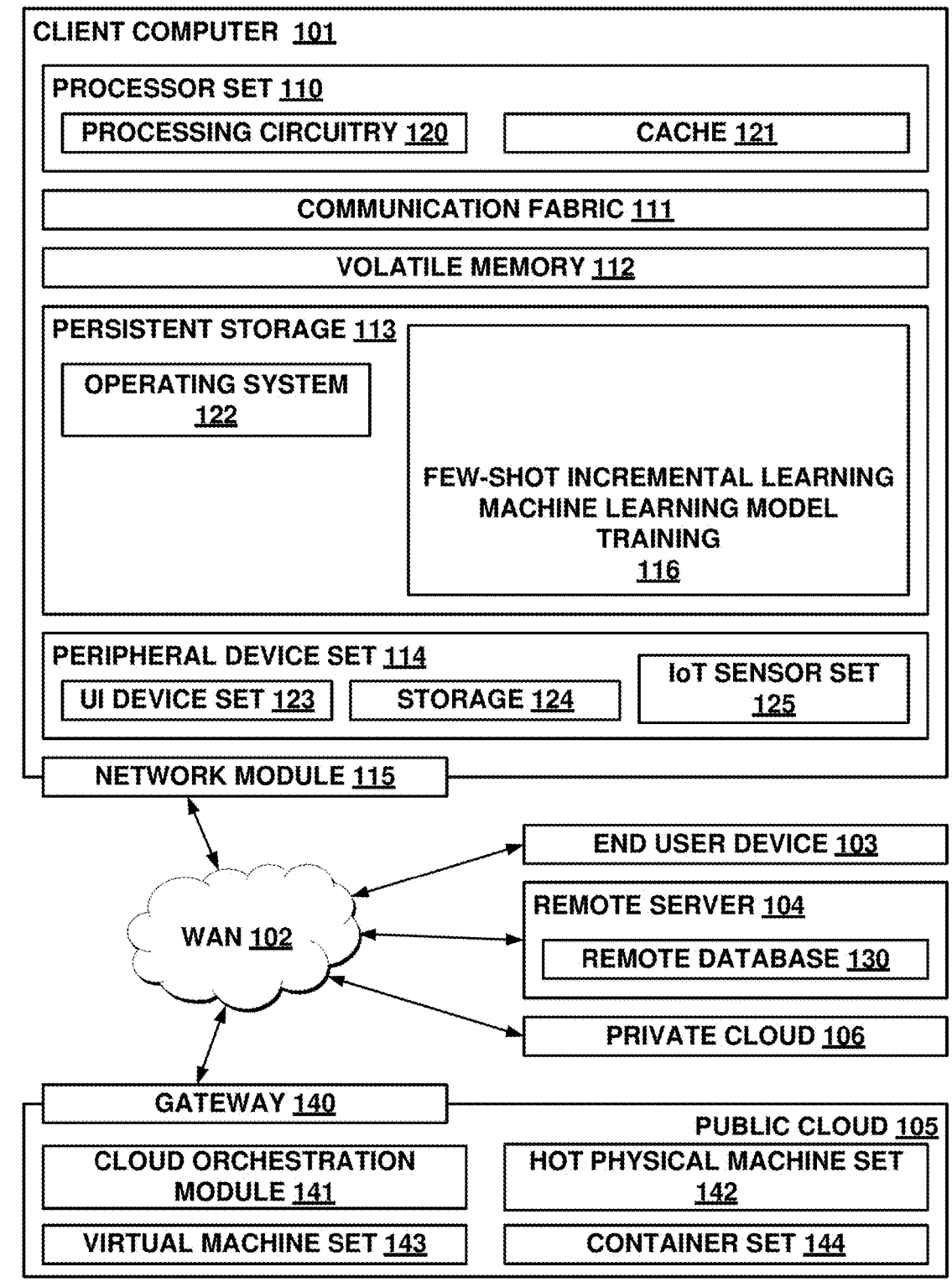
FIG. 1 illustrates a networked computer environment in which few shot incremental learning for training a deep learning model may be implemented according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, a method, and a computer program product for training a deep learning model to perform classification and then in some additional instances to perform classification with the so-trained model. The present embodiments achieve few-shot incremental learning and leverage prototypical networks-based architecture to support addition of new classes needing only few labeled samples of the new classes. The embodiments result in a trained deep learning model which successfully classifies for original classes as well as for the newly added classes. Using the techniques of the present embodiments, catastrophic forgetting of the original classes is avoided. Thus, the present embodiments improve the fields of artificial intelligence, deep learning models which are a type of machine learning models, efficient training of deep learning models, key value pair extraction, and named entity recognition. In at least some embodiments, an end-to-end system is provided with a prototypical network architecture based model which facilitates addition of new classes and uses joint loss function to alleviate catastrophic forgetting issue. The present embodiments allow this few-shot incremental training to be applied to real world applications.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as few-shot incremental deep learning model training 116. In addition to few-shot incremental deep learning model training 116, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and few-shot incremental deep learning model training 116, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in few-shot incremental deep learning model training 116 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in few-shot incremental deep learning model training 116 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing exceptionally large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
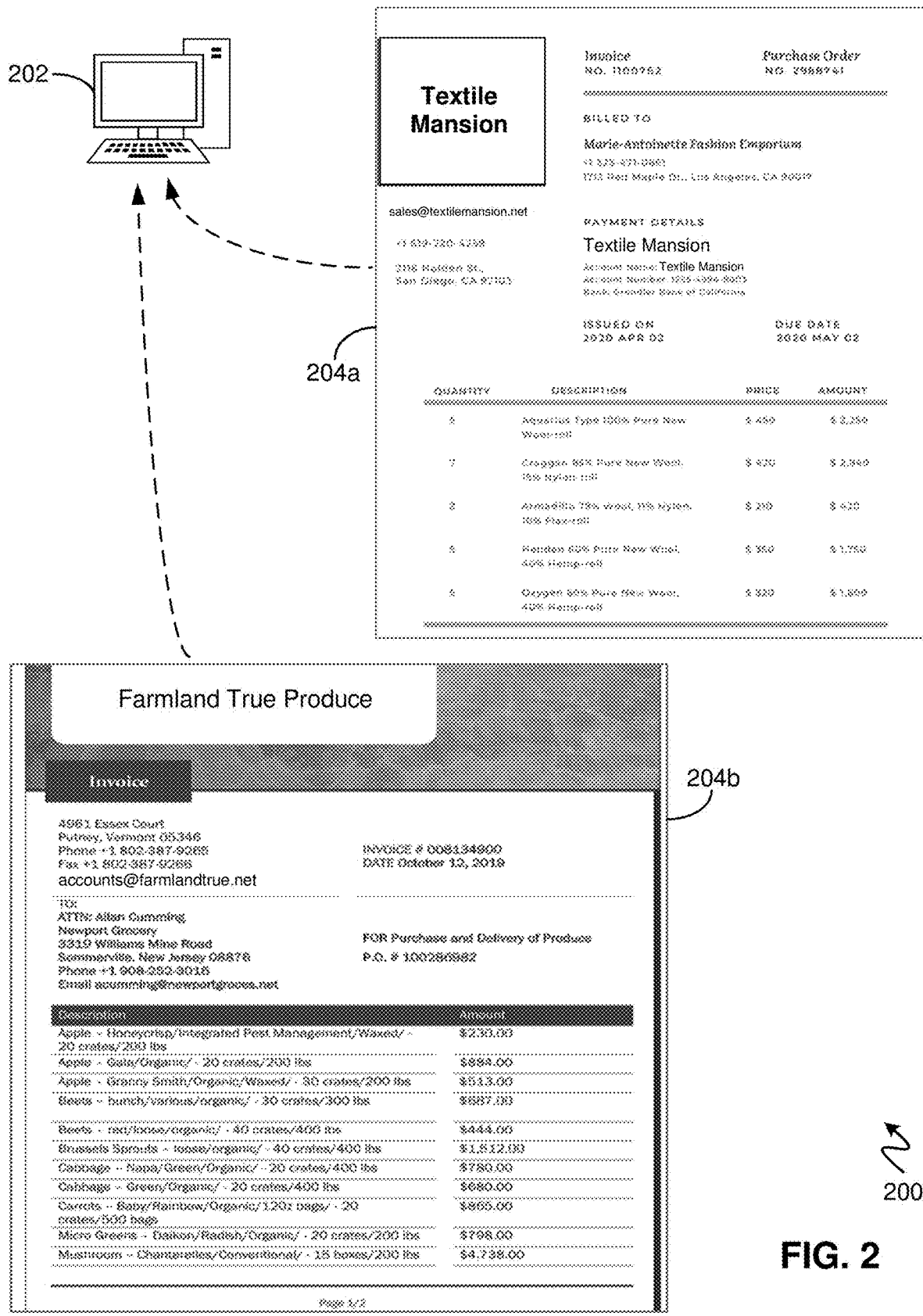
FIG. 2 illustrates a document on which key value pair extraction may be performed using a trained deep learning model according to at least one embodiment.

FIG. 2 illustrates a key value pair extraction environment 200 in which a deep learning model trained as described herein is implemented according to at least one embodiment. The host computer 202 may be equivalent to the client computer 101 shown in FIG. 1 and may host and/or access a deep learning model that was trained using the few-shot incremental deep learning model training 116. A user may input visually rich documents such as the first invoice 204a and/or the second invoice 204b to the host computer 202 for the deep learning model to perform classification, named entity recognition, and/or key value pair extraction on these documents. Key value pair extraction may include extracting meaningful attributes, phrases, and/or words from visually rich documents. The "key" of the key value pair extraction represents the information sought from the user/person. The key may have various values that represent the response. The key value pair extraction may be performed with token classification and/or named entity recognition (NER). Key value pair extraction may be performed for various visually rich documents such as purchase orders, invoices, insurance forms, loan application forms, mortgage forms, etc. The present embodiments may be used to enhance a deep learning model that is part of an automated document processing program/system. The present embodiments help make a way of more effectively providing additional training to the deep learning model so that the deep learning model may classify new keys while maintaining the ability to classify the original and any previously added key.

Although examples are shown in FIG. 2, the present embodiments may encompass the deep learning model, trained as herein disclosed, performing other types of classification of one or more new samples. For example, the present embodiments may encompass the trained deep learning model performing other types of named entity recognition besides the key value pair extraction. Named entity recognition is a type of information extraction that seeks to locate named entities used in a text corpus and classify the identified names into pre-defined categories such as person names, organizations, locations, medical codes, time expressions, quantities, monetary values, percentages, etc. Named entity recognition may include using a chunking-related technique to overcome a segmentation problem when a single name spans multiple words. Named entity recognition also may include choosing an ontology for organizing the various names in the analyzed text.

Figure 3:
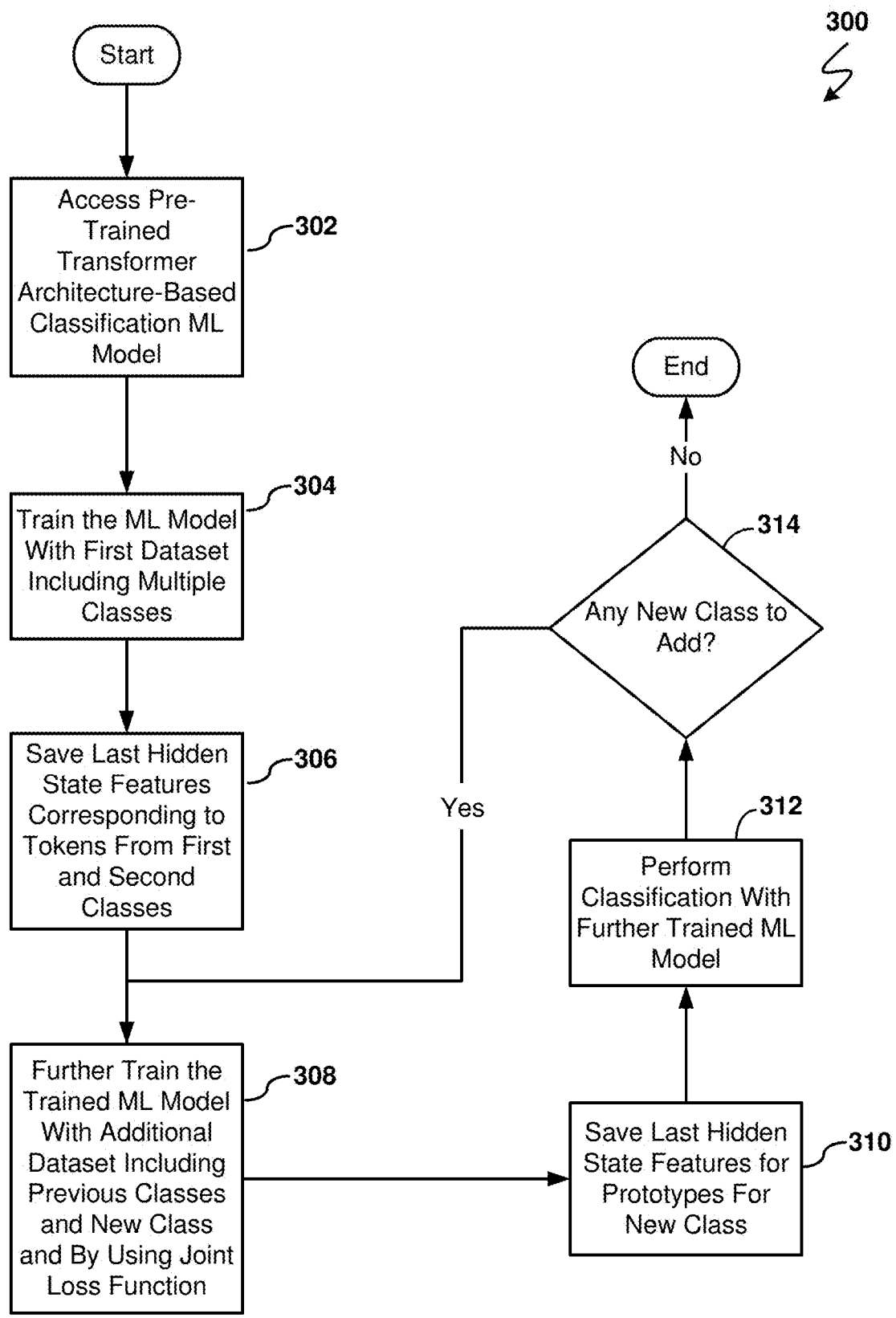
FIG. 3 is an operational flowchart illustrating a process for training a deep learning model according to at least one embodiment.

FIG. 3 illustrates an operational flowchart illustrating a few-shot incremental deep learning model training process 300 for training a deep learning model to perform classification for original and new classes.

Figure 4:
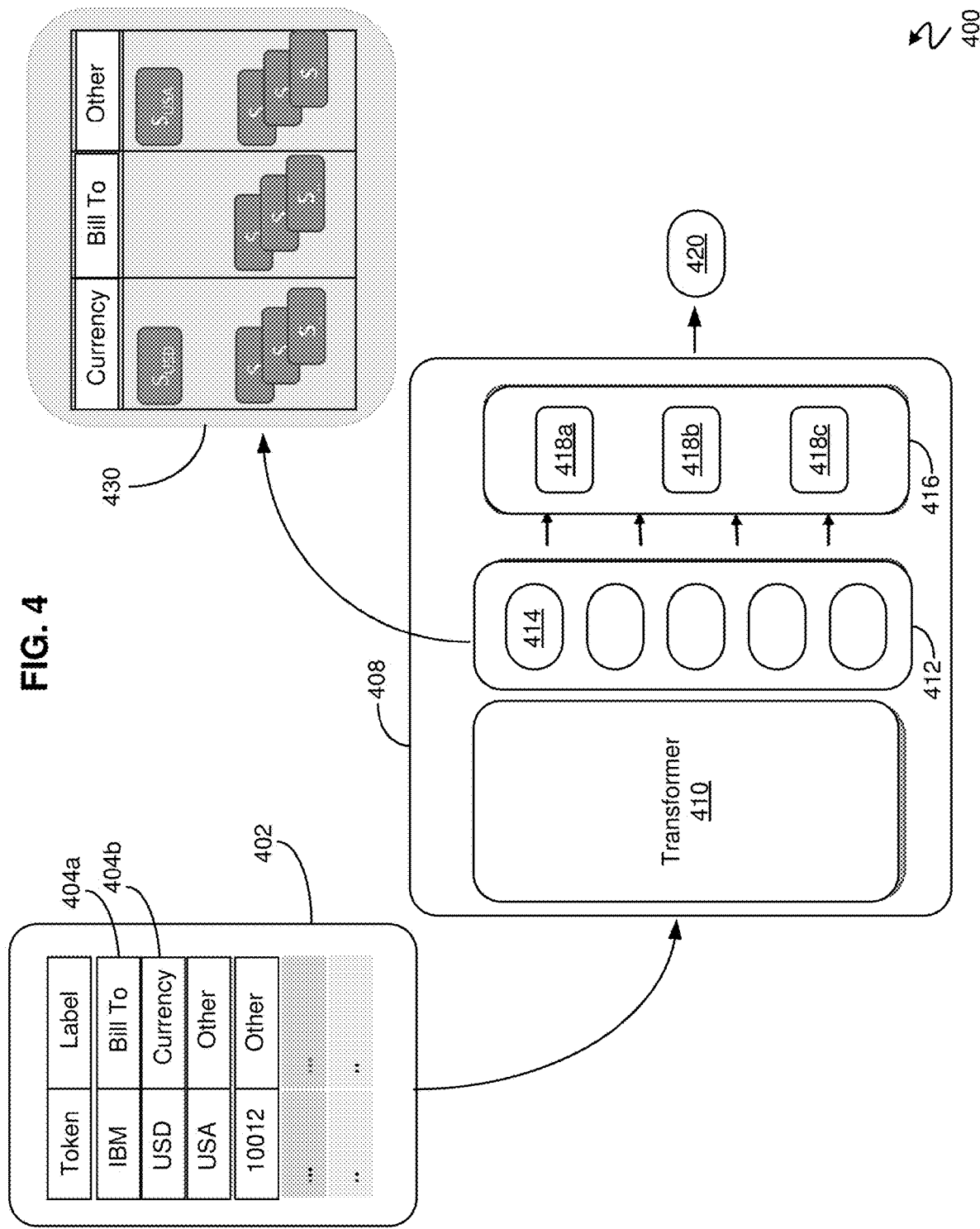
FIG. 4 illustrates a pipeline for a first stage of the training process of FIG. 3 according to at least one embodiment.

The steps 302, 304, and 306 of the few-shot incremental deep learning model training process 300 together may constitute a first stage of training the deep learning model. This first stage may, for terminology purposes, produce a trained deep learning model (as opposed to the second stage described subsequently which, for terminology purposes, produces a further trained deep learning model). FIG. 4 illustrates a first stage pipeline 400 illustrating aspects of performing this first stage.

In step 302 of the few-shot incremental deep learning model training process 300 shown in FIG. 3, a pre-trained transformer architecture-based classification deep learning model is accessed. This deep learning model may be accessed and/or received via a computer such as the client computer 101 shown in FIG. 1 which includes the few-shot incremental deep learning model training program 116. The deep learning model may be transmitted via a data transmission over the WAN network 102. The deep learning model may be stored in persistent storage 113 of the client computer 101. The deep learning model may also be disposed in a remote computer such as the remote server 104 and/or end user device 103 and accessed via a data transmission from the client computer 101. A deep learning model is a subset of machine learning models in general. A deep learning model is essentially a neural network with three or more layers. These neural networks attempt to simulate the behavior of the human brain—albeit far from matching its ability—allowing the model to learn from large amounts of data. The deep learning model may include multiple hidden layers to help optimize and refine the inference performance of the model for accuracy.

The deep learning model that is accessed in step 302 and includes transformer architecture may include a transformer that is a deep learning model that adopts the mechanism of self-attention. The transformer may be able to perform token classification. The self-attention is implemented by differentially weighting the significance of each part of the input data. Transformers are designed to process sequential input data, such as natural language, with applications towards a variety of natural language processing tasks. Unlike recurrent neural networks, transformers process the entire input all at once. The attention mechanism provides context for any position in the input sequence. For example, if the input data is a natural language sentence, the transformer does not have to process one word at a time. This use of self-attention allows for increased parallelization and, therefore, reduced training times. The additional training parallelization allows training on larger datasets such as is available with a more popular language such as English versus a language used by a smaller population base. Attention mechanisms let a model draw from the state at any preceding point along the sequence. The attention layer can access all previous states and weigh them according to a learned measure of relevance, providing relevant information about far-away tokens. Transformers use an attention mechanism without a recurrent neural network (RNN), processing all tokens at the same time and calculating attention weights between them in successive layers. Because the attention mechanism only uses information about other tokens from lower layers, a layer can compute its own values for all tokens in parallel, which leads to improved training speed.

In at least some embodiments, input data such as input text is parsed into tokens by a byte pair encoding tokenizer that is for or part of the transformer of the deep learning model accessed in step 302. A tokenizer breaks unstructured data and natural language text into chunks of information that can be considered as discrete elements. The token occurrences in a text body may be used as a vector representing the word. Through this tokenization, an unstructured string is converted into a numerical data structure that is more suitable for analysis in machine learning. Each token is converted via a word embedding into a vector. Positional information of the token is added to the word embedding. Some embodiments may include transformers with an encoder-decoder architecture. The encoder includes encoding layers that process the input iteratively one layer after another. The decoder includes decoding layers that do the same thing to the output of the encoder. The function of each encoder layer is to generate encodings that contain information about which parts of the inputs are relevant to each other. A layer passes its encodings as inputs to the next encoder layer. Each decoder layer does the opposite, taking all the encodings and using their incorporated contextual information to generate an output sequence. To achieve this, each encoder and decoder layer makes use of an attention mechanism. For each part of the input, attention weighs the relevance of every other part and draws from those weights to produce the output. Each decoder layer may have an additional attention mechanism that draws information from the outputs of previous decoders before the decoder layer draws information from the encodings. Both the encoder and decoder layers may be implemented in a feed-forward neural network for additional processing of the outputs and may contain residual connections and layer normalization steps. The transformer building blocks are scaled dot-product attention units. When a sentence is passed into a transformer model, attention weights are calculated between every token simultaneously. The attention unit produces embeddings for every token in context that contain information about the token itself along with a weighted combination of other relevant tokens each weighted by its attention weight.

The deep learning model that is accessed in step 302 in at least some embodiments is a pre-trained model which means that the model has already before step 302 received some training of how to perform a natural language processing task. Such pre-training may occur on various generic data sets such as large text corpora that are accessible, e.g., accessible online, and are input into the deep learning model. In some embodiments, a precursor step to step 302 includes performing this pre-training of the deep learning model to be able to perform some natural language processing task. This pre-training may occur in a supervised manner with labeled samples and/or in an unsupervised manner without labeled samples. A user may upload a pre-training text corpus as a file into a web portal of/for the program for few-shot incremental deep learning model training 116. The few-shot incremental deep learning model training program 116 may receive access to a pre-training text corpus in any equivalent fashion. A user may load such a file into a web portal via a computer. In some instances, a pre-training text corpus may be gleaned from books and encyclopedias such as an online encyclopedia. Thus, in some embodiments a precursor to step 302 may include web crawling to gather a pre-training text corpora.

In embodiments where the deep learning model is trained to analyze layout aspects of a document in addition to textual aspects, the deep learning model may be pre-trained using text embeddings, visual embeddings, and layout embeddings. The deep learning model may further include a multi-modal encoder with spatial-aware self-attention mechanism. The deep learning model may be pre-trained using a masked visual-language modeling task, a text-image alignment task, and a text-image matching task.

FIG. 4 illustrates that a pre-trained deep learning model is further trained to produce a trained deep learning model 408 that includes a transformer 410, hidden layers of which a last hidden layer 412 is shown, and a classification layer 416. The last hidden layer 412 includes various nodes of which a first hidden node 414 is labeled. The classification layer 416 includes classification nodes corresponding to a number of classes predicted. The classification layer 416 illustrates an example where two classes are known, so the first classification node 418*a* is for a first class, the second classification node 418*b* is for a second class and the third classification node 418*c* represents an "other" category for any sample which does not fall within the first or the second class. The output of the last hidden layer 412 is fed into the classification layer 416. The output of the classification layer 416 is deep learning model output 420 which represents a class prediction made by the trained deep learning model 408 for an input sample. Due to the training of step 304 described below, the trained deep learning model 408 in the depicted example will have the classification layer 416 with three classification nodes (first class, second class, and other).

In step 304 of the few-shot incremental deep learning model training process 300 shown in FIG. 3, the deep learning model is trained with a first dataset including multiple classes. This deep learning model trained in step 304 is the deep learning model that was accessed in step 302. In at least some embodiments, this training will include supervised training where a data set, e.g., a first data set, with class annotations/labels is input into the deep learning model. By inputting the annotated samples into the deep learning model, the deep learning model learns to recognize the particular classes. After analyzing these annotated training samples, if the deep learning model thereafter receives a new unlabeled sample showing an example of one of the classes the deep learning model is able to correctly predict the class of the new unlabeled sample.

In the first stage pipeline 400 shown in FIG. 4, a large dataset 402 is illustrated which is used to train the pre-trained deep learning model so that the trained deep learning model 408 is produced. The large dataset includes examples of a first labeled class 404a and a second labeled class 404b as well as other examples. In this example, the first labeled class 404a indicates an entity to which a bill can be made out. A company and/or an individual are examples of such an entity. IBM (IBM® (IBM and all IBM-based trademarks and logos are trademarks or registered trademarks of International Business Machines Corporation and/or its affiliates) is shown as an example of one prototype of the first labeled class 404a indicating an entity to which a bill can be made out. FIG. 4 calls this first entity class a "Bill To" class. In this example, the second labeled class 404b indicates a currency type. USD (US dollars) are an example of such a class and is shown as one example of a prototype of the second labeled class 404b. Other entities are indicated in the shown sample of FIG. 4 but are part of an unknown or unimportant class so are grouped in an "Other" category. The large dataset 402 is in the depicted embodiment input into the pre-trained deep learning model in order to further train the pre-trained deep learning model and produce the trained deep learning model 408. Via the training, the trained deep learning model 408 learns to predict entities of the first and second labeled classes 404a, 404b, respectively.

For step 304, a user may upload the training dataset, e.g., the large dataset 402, as a file into a web portal of/for the few-shot incremental deep learning model training program 116. The program 116 may receive access to the training dataset in any equivalent fashion. A user may load such a file into a web portal via a computer. The receiving may occur via the few-shot incremental deep learning model training program 116 receiving an uploaded file at a computer and/or server. Such file may be transmitted via a network such as the WAN 102 shown in FIG. 1.

In at least some embodiments, the training of step 304 may include providing annotated samples for at least first and second prototypes of a first class and additionally first and second prototypes of a second class. For example, if for an NER task a first class is established as a company name and a second class is established as currency, annotated samples include multiple examples of prototypes of company names (e.g., Widget Corp., Transactional Consulting Inc., Farmland True Produce (see second invoice 204b in FIG. 2), Textile Mansion (see first invoice 204a in FIG. 2), Marie-Antoinette Fashion Emporium (see first invoice 204a in FIG. 2), etc.) and other multiple examples of prototypes of currency (e.g., USD (U.S. dollars), CNY (Chinese Yuan), JPY (Japanese Yen), MXN (Mexican peso) etc.).

The annotated samples may include example invoices that show an actual document with the prototype examples and classes appearing within the body of the document but marked in some manner to indicate a particular class. For example, the entities and their examples may be indicated with highlighted background color for the font, bolded font, and/or underlining of the text, etc.

For the training, the deep learning model adjusts the weights and values of nodes in its various layers until the deep learning model improves its predictive ability to regularly be able to predict the designated classes that are part of the labels of the annotated samples.

As a part of step 304, pre-processing of the training dataset may be performed. This pre-processing may include converting any non-word characters in the text into a corresponding textual form. For example, numbers, percentage data, '.com' etc. may be converted in this pre-processing. The following three sentences contain examples of this preprocessing. The number "8" may be pre-processed to read "eight". The text "37%" may be pre-processed to be thirty-seven percent. The text "website.com" may be pre-processed to be "web site dot com".

In step 306 of the few-shot incremental deep learning model training process 300 shown in FIG. 3, last hidden state features corresponding to tokens from first and second classes are saved. The last hidden state features are taken from the deep learning model that was trained in step 304. In at least some embodiments, the saving of the last hidden state features occurs from one of the last few epochs of the training, whereby classification performed via the deep learning model is correct in the selected one of the last few epochs. For example, for a first prototype of a first class, a first set of last hidden state features may be saved and stored in a database. For a second prototype of a first class, another different set, e.g., a second set, of last hidden state features may be saved and stored in the database. For a first prototype of a second class, another different set, e.g., a third set, of last hidden state features may be saved and stored in the database. For a second prototype of the second class, another different set, e.g., a fourth set, of last hidden state features may be saved and stored in the database. The number of sets of hidden state features that are saved from the last layer before the classification layer may equal the number of total prototypes from the specified classes established in the training of step 304. A respective value from a majority, most, and/or all of the last hidden state nodes may be gathered and saved as part of saving of the last hidden state features of step 306 for a respective prototype. The database may be within the persistent storage 113 of the client computer 101 and/or in additional storage in the remote server 104, in the private cloud 106, and/or in the public cloud 105.

The last hidden state refers to the node values within the last hidden layer before the classification layer of the deep learning model. The classification layer represents the last layer of the deep learning model and generally includes one classification node per identified class. The last hidden layer may include a number of hidden nodes which is larger than the number of the classification nodes. For example, in a layout-analyzing deep learning model the last hidden state may include 768 nodes within the last hidden state, even when the number of classification nodes is substantially smaller, e.g., is two or three.

Figure 5:
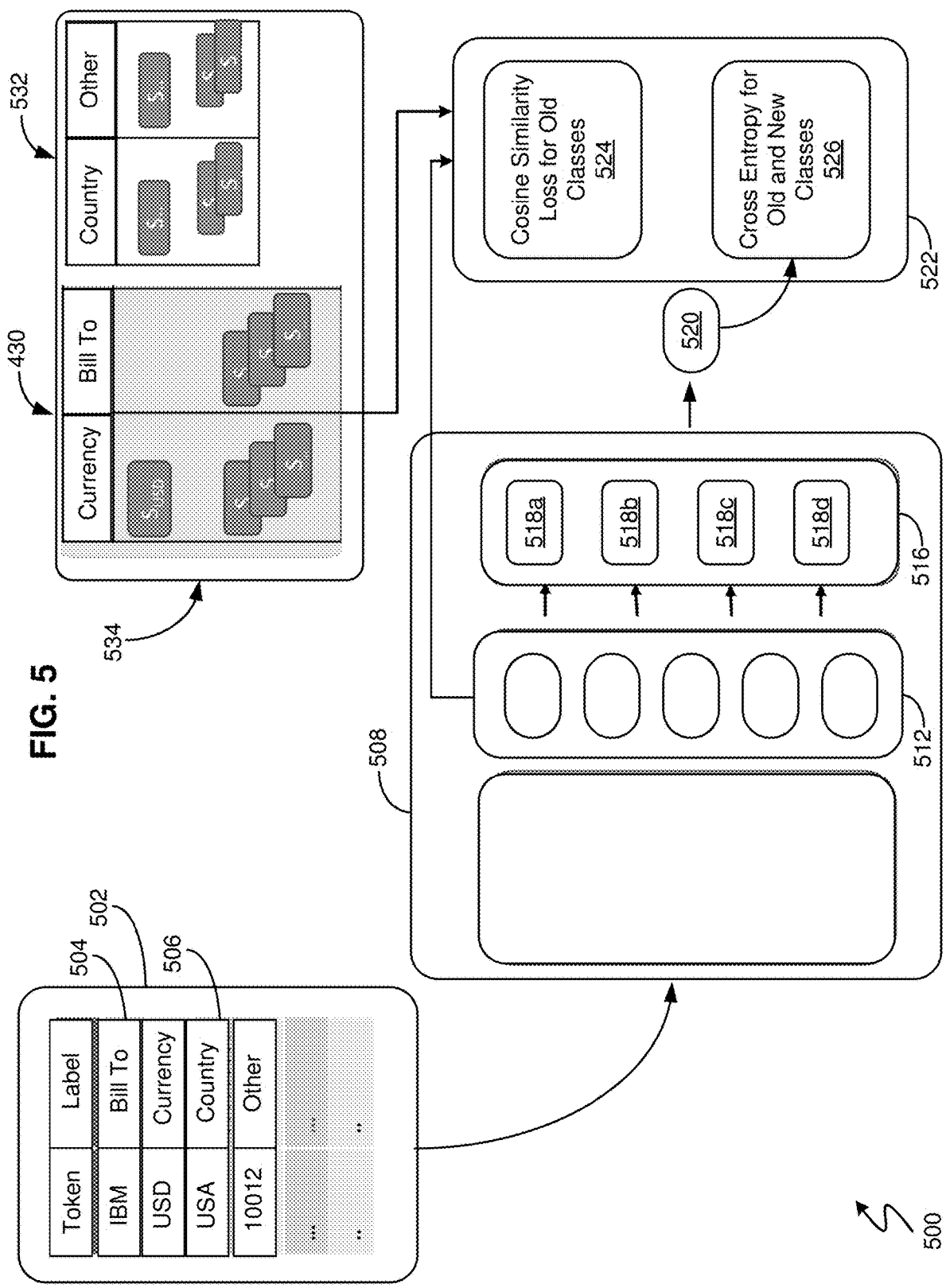
FIG. 5 illustrates a pipeline for a second stage of the training process of FIG. 3 according to at least one embodiment.
Figure 6:
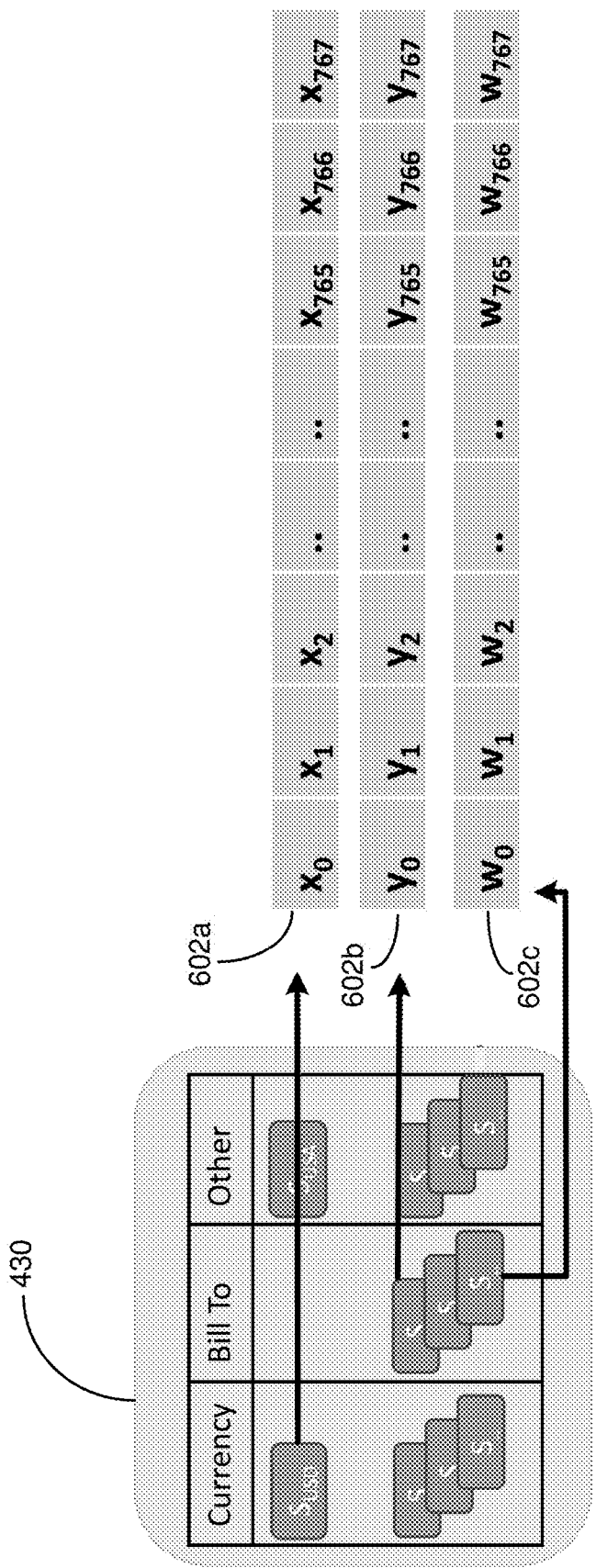
FIG. 6 illustrates a view of sets of last hidden state features used in the training process of FIG. 3 and in the stages of FIGS. 4 and 5.

FIG. 6 illustrates a view of sets of last hidden state features used in the training process of FIG. 3 and in the stages of FIGS. 4 and 5. FIG. 6 shows a first set 602a (from the currency class), a second set 602b (from a first prototype of the "bill to" class), and a third set 602c (from another prototype of the "bill to" class) of respective last hidden state features from a respective prototype taken from the prototype pool 430. Each set of last hidden state features represents a vector of a particular length that corresponds to the length/node numbers of the last hidden state of the deep learning model. In the example illustrated in FIG. 6, the first set 602*a*, the second set 602*b*, and the third set 602*c* each are a vector of a length of seven hundred and sixty eight. The number of prototypes in each class may be selected by a design engineer who engages with the program 116 or may be a default number. Each prototype may represent a family/sub-class within the respective designated class. For example, for an "address" class each prototype family may refer to an address format used in a respective different country. The prototype may refer to an average of vector values used for every sample that falls within the prototype family/sub-class. For each class and for the other category, in at least some embodiments each of these classes and the other category have the same number of prototypes. The "other" prototypes may be included in the trained deep learning model performing inferencing but are not involved in the training of the deep learning model to learn additional classes. The "other" prototypes may be discarded before the beginning of each new incremental round of training for the deep learning model to learn one or more additional classes.

The last hidden state may be removed from the deep learning model by extracting code and/or values from the last layer before the classification layer. The set of values may then be stored as a group within the prototype pool within the data storage. Thus, the stored set of values may be accessed and used for comparison and optimization after subsequent training of the deep learning model to add more classes as will be explained subsequently. This usage of the last hidden state features corresponding to particular prototypes of the classes renders the present embodiments to encompass prototypical networks-based architecture.

The first stage pipeline 400 shown in FIG. 4 includes a prototype data pool 430 in which sets of last hidden state features are saved in computer memory storage. FIG. 4 shows the prototype data pool 430 being organized according to the labeled classes included in the large dataset 402. Specifically, the prototype data pool 430 is shown as saving multiple sets of last hidden state features corresponding to multiple prototypes of the first labeled class 404*a* ("Bill To") and of the second labeled class 404*b* ("Currency").

Steps 308 and 310 that are described below may together constitute a second stage of training the deep learning model. This second stage may, for terminology purposes, produce a further trained deep learning model. FIG. 5 illustrates a second stage pipeline 500 illustrating aspects of performing this second stage. In at least some embodiments, the second stage including steps 308 and 310 is performed without using and/or needing access to the large training dataset 402.

In step 308 of the few-shot incremental deep learning model training process 300 shown in FIG. 3, the trained deep learning model is further trained with an additional dataset that includes previous classes and at least one new class and by using a joint loss function. In the first time of performing step 308, this additional dataset may be considered a second dataset in comparison to the first dataset that was used to train the deep learning model in step 304. In at least some embodiments, the first dataset is larger than the second dataset. In at least some embodiments, the first dataset is ten or more times larger than the second dataset with respect to the number of samples and/or annotated samples provided. In at least some embodiments, the second dataset consists of thirty or fewer annotated samples, e.g., consists of a number of annotated samples within the inclusive range of from twenty to thirty samples. The additional dataset includes examples of an additional class. Thus, step 308 is an example of adding one or more new classes via few-shot learning. The second dataset includes annotations for one or more new classes as well as annotations for the previous classes used in training in steps 304 and 306. The annotations for the one or more new classes may include multiple samples/prototypes for each of the one or more new classes, respectively. In an embodiment for which the first stage of training trained the deep learning model to recognize first and second classes, the step 308 may include training the same deep learning model to recognize and predict a third class. This further training resets the deep learning model and the classification layer so that the new class, e.g., the third class, may be predicted by the further trained deep learning model.

In the second stage pipeline 500 shown in FIG. 5, an additional dataset 502 is illustrated which is an example of the additional dataset for step 308. This additional dataset 502 may be used to further train the trained deep learning model 408 from FIG. 4 to produce a further trained deep learning model 508 shown in FIG. 5. The additional dataset 502 includes new annotations for the first and second classes as well as annotations for the new class to be added. A new first class annotation 504 is labeled. Additionally, an annotation is provided for a third labeled class 506 which in this example is a new "country" class with the specific example shown of USA as an example of a prototype of this new class. The additional dataset 502 also includes a label of "Other" for any entity not falling within the three labeled classes. The step 308 includes inputting the additional dataset 502 into the trained deep learning model 408 in order to help produce the further trained deep learning model 508 which can predict/infer an additional third class in addition to the original first two classes.

FIG. 5 illustrates that the further trained deep learning model 508 still includes the transformer, includes updated hidden layers of which an updated last hidden layer 512 is shown, and an updated classification layer 516. The updated last hidden layer 512 includes various nodes. The updated classification layer 516 includes updated classification nodes corresponding to the new number of classes predicted including the new one or more classes added in step 308. The updated classification layer 516 illustrates an example where three classes are known, so the first updated classification node 518*a* is for the first class, the second updated classification node 518*b* is for the second class, and a new third classification node 518*c* represents the new third class which the deep learning model is, via step 308, trained to recognize and predict. The fourth classification node 518*d* is for an updated "other" category for any sample which does not fall within the first, second, or third class. Due to the addition of the new third class, the other category will be different from the third classification node 418*c* for the other category of the first stage pipeline 400 shown in FIG. 4. The output of the updated last hidden layer 512 is fed into the updated classification layer 516. The output of the updated classification layer 516 is further trained deep learning model output 520 which represents a class prediction made by the further trained deep learning model 508 in response to the further trained deep learning model 508 receiving an input sample. Due to the training of step 308 described herein, the further trained deep learning model 508 will have the classification layer with four classification nodes (first class, second class, third class, and other).

The joint loss function used for further training of the deep learning model in step 308 includes performing both a cosine similarity loss optimization and a cross entropy loss optimization.

The cosine similarity loss optimization that is part of the joint loss function of step 308 is performed with respect to last hidden state features resulting from the further trained deep learning model, the first class, and the second class compared to the saved last hidden state features. As the new samples are input into the deep learning model to further train the model, performance for correctly predicting the original classes, e.g., the first and second classes, is maintained by comparing and optimizing the last hidden state features generated from the first and second classes from the samples of the second dataset to most closely approximate the last hidden state features for the first and second classes, respectively, produced from the samples of the first dataset that have been stored in the prototype pool 430. Specifically, the last hidden state features for recognizing the first class from the samples of the second dataset (that are produced from this active training in the second stage) are compared to the last hidden state features (from the first stage) stored in the prototype pool 430 for the first class so that the weights of the nodes and/or layers of the deep learning model may be adjusted so that these two sets of last hidden state features most closely approximate each other. Likewise, the last hidden state features for recognizing the second class from the samples of the second dataset (that are produced from this active training in the second stage) are compared to the last hidden state features (from the first stage) stored in the prototype pool for the second class so that the weights of the nodes and/or layers of the deep learning model may be adjusted so that these two sets of last hidden state features most closely approximate each other. Each set of hidden state features may represent a set of vectors on which cosine similarity measurements may be performed. In at least some embodiments, the cosine similarity optimization includes performing Kullback-Leibler divergence (KL divergence).

FIG. 5 shows that, for the cosine similarity loss for old classes 524, (1) sets of saved last hidden state features are retrieved from the prototype pool 430 and (2) sets of saved last hidden state features retrieved from the updated deep learning model during the further training of step 308 are retrieved and compared to each other.

The cross entropy loss optimization that is part of the joint loss function of step 308 is for classification of the first class, the second class, and the third class. In other words, the weights and/or values of the nodes and/or layers of the deep learning model are adjusted until the deep learning model correctly predicts samples as belonging to one of the various classes, such as the first, second, or third class. The deep learning model is adjusted to minimize the cross-entropy between classes and to maximize the differences between the output predictions from samples from the various classes. In at least some embodiments, the cross entropy loss optimization includes performance of a known nearest neighbor (kNN) algorithm for distinguishing between the different classes. The second or additional dataset includes labels for the first class, so the deep learning model weights and/or values of the deep learning model may be adjusted until the deep learning model correctly predicts samples from the first class. The second or additional dataset includes labels for the second class, so the weights and/or values of the deep learning model may be adjusted until the deep learning model correctly predicts samples from the second class. The second or additional dataset also includes labels for the third class, so the weights and/or values of the deep learning model may be adjusted until the deep learning model correctly predicts samples from the third class.

FIG. 5 shows that for the cross entropy for old and new classes 526 the further trained deep learning model output 520 which includes a class prediction/inference is taken and analyzed. Based on the analysis, the weights of the deep learning model are optimized in order for the so-updated deep learning model to correctly predict to which class (including the possible new class) an input sample belongs.

Via the joint loss function which performs both the cosine similarity loss optimization and the cross entropy loss optimization, the further trained deep learning model learns how to predict the newly added one or more classes while also maintaining high classification performance for predicting the previously added classes, e.g., the first and second classes. Also the second dataset may be a relatively small dataset so that this training for the new class may be performed in a few-shot manner.

In step 308, the trained deep learning model may be further trained and adjusted until the deep learning model optimizes the performance and loss for both the cosine similarity comparison of the sets of last hidden state features as well as for the cross entropy evaluations for classification of all of the classes.

In step 310 of the few-shot incremental deep learning model training process 300 shown in FIG. 3, last hidden state features for prototypes for the new class are saved. For the first passing through of this portion of the few-shot incremental deep learning model training process 300, these last hidden state features saved in step 310 may be from prototypes from any new class for which the deep learning model was trained in step 308, e.g., for at least the third class. These values of the last hidden state features correspond to those values of the sets that were saved in step 306 but would usually be different values due to the different classes. These values for the new class may be stored in the same prototype pool at which the sets of last hidden state features were saved for the prototypes of the earlier classes. For example, these new sets may be stored in the persistent storage 113 of the computer 101, in data storage of the remote server 104, in the private cloud 106, and/or in the public cloud 105. In at least some embodiments, the saving of the last hidden state features in step 310 occurs from one of the last few epochs of the further training whereby classification performed via the deep learning model is correct in the selected one of the last few epochs of the further training.

The second stage pipeline 500 shown in FIG. 5 includes an updated prototype data pool 534 in which sets of last hidden state features are saved in computer memory storage. FIG. 5 shows the updated prototype data pool 534 as including those sets of last hidden state features saved from the original prototype data pool 430 as well as additional sets 532 of last hidden state features corresponding to prototypes of the new labeled third class 506. Thus, the additional sets 532 includes sets of last hidden state features corresponding to different entities falling within the "Country" class, e.g., a USA prototype. The "Other" category may also be different from the previous "Other" category from the first stage due to the addition of the new third class which changes the scope of what falls within the "Other" category.

In step 312 of the few-shot incremental deep learning model training process 300 shown in FIG. 3, classification is performed with the further trained deep learning model. This further trained deep learning model refers to that deep learning model that is further trained and/or refined in the step 308, e.g., the further trained deep learning model 508 shown in FIG. 5. The classification of step 312 may be named entity recognition, key value pair extraction, and/or some other type of classification in which the deep learning model is able to correctly perform inference on multiple classes that were annotated in the first and additional datasets and on the one or more additional samples that were annotated in the additional dataset.

In step 314 of the few-shot incremental deep learning model training process 300 shown in FIG. 3, a determination is made whether there is any new class to add for the deep learning model to learn. If the determination of step 314 is affirmative and there is a new class for the further trained deep learning model to learn, the few-shot incremental deep learning model training process 300 proceeds back to step 308 for a repeat of steps 308, 310, and/or 312 with respect to the new class. If the determination of step 314 is negative and there is no new class for the further trained deep learning model to learn, the few-shot incremental deep learning model training process 300 may end and perform further classification with the existing learned classes. The determination of step 314 may occur via the few-shot incremental deep learning model training program 116 recognizing whether any command has been received to perform training for an additional class. The few-shot incremental deep learning model training program 116 may generate a graphical user interface which allows a user to indicate when training for an additional class should proceed. A user may engage with the graphical user interface via an input device of a computer such as the computer 101 in order to indicate that additional training should be performed via the few-shot incremental deep learning model training program 116.

For a repeat of steps 308, 310, and/or 312 with respect to one or more new classes, in step 308 a new additional dataset is needed which includes annotations for all classes including previous classes and any new class. In at least some embodiments this new additional dataset is smaller (in the number of annotated samples) than the original dataset that was used in step 304. This new additional dataset in at least some embodiments includes thirty or fewer annotated samples of the various classes, e.g., a includes a number of samples within an inclusive range of from twenty to thirty annotated samples. For the repeat of step 310, this step 308 can mimic the previous performance of step 308 but additionally the cosine similarity comparison can include comparison of last hidden state features of the original classes but also comparison of last hidden state features of the previous new classes that were added in previous iterations of steps 308 and 310. For example, this current performance of steps 308 and 310 may add a fourth class when the previous iteration added a third class on top of two original classes. Then in step 310 the last hidden state features from the fourth class may be saved in the prototype data pool in order to prepare for possible incremental few-shot learning for new classes, e.g., for a fifth class, which might happen in the future.

It may be appreciated that FIGS. 2-5 provide only illustrations of certain embodiments and do not imply any limitations with regard to how different embodiments may be implemented. Many modifications to the depicted embodiment(s), e.g., to the particular steps and/or order of the depicted method, may be made based on design and implementation requirements.

In one example, base (first stage) model training occurred to perform key value pair extraction with a first training set of 2600 samples, five keys/classes, and fifty prototypes per class. The five keys/classes were PO #, Logo Customer Name, Ship to Address, Ship to Customer Name, and Other. A set of 142 samples were then applied to the so-trained deep learning model to test the ability of the deep learning model to predict entities as belonging to one these five keys/classes.

Using the features described herein, a second stage of model training occurred in which the so-trained deep learning model was further trained to recognize six additional keys/classes. The six additional keys/classes were Bill-to Address, Bill-to Customer Name, Country, Currency, Customer Name, and PO Amount. For the second stage, forty training samples were used with fifty prototypes each for the six additional keys/classes. The further trained deep learning model trained in the second stage according to the features described herein maintained a high precision and recall for ability to predict the original five classes as well as achieving a high precision and recall for the ability to predict the six new keys/classes. The further trained deep learning model outperformed a regular model which used incremental datasets only to further train the deep learning model.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments. In this regard, each block in the flowchart, pipeline, and/or block diagrams may represent a module, segment, or portion of instructions, which comprises one or more executable instructions for implementing the specified logical function(s).

What is claimed is:

1. A method comprising:
   training a deep learning model with a first dataset comprising annotated samples that comprise a first class and a second class;
   saving last hidden state features corresponding to respective tokens from prototypes of the first class and of the second class;
   further training the trained deep learning model with a second dataset comprising additional annotated samples that comprise the first class, the second class, and a third class, wherein the further training comprises performing:
   a vector comparison loss optimization of last hidden state features resulting from the further trained deep learning model, the first class, and the second class compared to the saved last hidden state features and a cross entropy loss optimization for classification of the first class, the second class, and the third class; and using the further trained deep learning model to perform classification of one or more new samples.

2. The method of claim 1, wherein the first dataset is larger than the second dataset.

3. The method of claim 2, wherein the first dataset is ten or more times larger than the second dataset.

4. The method of claim 1, wherein the second dataset consists of thirty or fewer annotated samples.

5. The method of claim 1, wherein:

the respective tokens are from first and second prototypes of the first class and from first and second prototypes of the second class, and the vector comparison loss optimization occurs for the last hidden state features resulting from the further trained deep learning model, the first and the second prototypes of the first class, and the first and the second prototypes of the second class compared to the saved last hidden state features.

6. The method of claim 1, further comprising saving additional last hidden state features corresponding to respective tokens from prototypes of the third class.

7. The method of claim 6, further comprising adding a fourth class to the further trained deep learning model by repeating the further training with the first class, the second class, the third class, and the fourth class.

8. The method of claim 1, wherein the classification of the one or more new samples comprises named entity recognition.

9. The method of claim 1, wherein the classification of the one or more new samples comprises key value pair extraction.

10. The method of claim 1, wherein the deep learning model comprises a transformer architecture.

11. The method of claim 10, wherein the deep learning model is pre-trained using text embeddings, visual embeddings, and layout embeddings.

12. The method of claim 11, wherein the deep learning model further comprises a multi-modal encoder with spatial-aware self-attention mechanism.

13. The method of claim 10, wherein the deep learning model is pre-trained using a masked visual-language modeling task, a text-image alignment task, and a text-image matching task.

14. The method of claim 1, wherein the first dataset is not used in the further training.

15. The method of claim 1, wherein the saving of the last hidden state features occurs from a last few epochs of the training, classification performed via the deep learning model being correct in the last few epochs.

16. A computer system comprising:

one or more processors, one or more computer-readable memories, and program instructions stored on at least one of the one or more computer-readable memories for execution by at least one of the one or more processors to cause the computer system to:

train a deep learning model with a first dataset comprising annotated samples that comprise a first class and a second class;

save last hidden state features corresponding to respective tokens from prototypes of the first class and of the second class; and further train the trained deep learning model with a second dataset comprising additional annotated samples that comprise the first class, the second class, and a third class, wherein the further training comprises performing:

a vector comparison loss optimization of last hidden state features resulting from the further trained deep learning model and the first class and the second class compared to the saved last hidden state features and a cross entropy loss optimization for classification of the first class, the second class, and the third class; and use the further trained deep learning model to perform classification of one or more new samples.

17. A computer program product comprising a computer-readable storage medium having program instructions embodied therewith, the program instructions executable by a computer to cause the computer to:

train a deep learning model with a first dataset comprising annotated samples that comprise a first class and a second class;

save last hidden state features corresponding to respective tokens from prototypes of the first class and of the second class; and further train the trained deep learning model with a second dataset comprising additional annotated samples that comprise the first class, the second class, and a third class, wherein the further training comprises performing:

a vector comparison loss optimization of last hidden state features resulting from the further trained deep learning model and the first class and the second class compared to the saved last hidden state features and a cross entropy loss optimization for classification of the first class, the second class, and the third class.

18. The computer program product of claim 17, wherein the program instructions are further for execution by the computer to cause the computer to save additional last hidden state features corresponding to respective tokens from prototypes of the third class.

19. The computer program product of claim 17, wherein the vector comparison loss optimization comprises a cosine similarity loss optimization.

20. The method of claim 1, wherein the vector comparison loss optimization comprises a cosine similarity loss optimization.

* * * * *